United States Patent
Rohan et al.

(10) Patent No.: US 10,225,944 B2
(45) Date of Patent: Mar. 5, 2019

(54) MOUNTING PLINTH FOR SELF-SERVICE TERMINAL (SST)

(71) Applicant: NCR Corporation, Duluth, GA (US)

(72) Inventors: Charles G. V. Rohan, Scotland (GB);
Steven J. Bernie, Scotland (GB);
Grant Paton, Scotland (GB); Stephen W. Swaine, Scotland (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/010,334

(22) Filed: Jan. 29, 2016

(65) Prior Publication Data
US 2017/0223856 A1   Aug. 3, 2017

(51) Int. Cl.
| | |
|---|---|
| *G06Q 20/18* | (2012.01) |
| *G06F 1/16* | (2006.01) |
| *H05K 7/14* | (2006.01) |
| *G07F 19/00* | (2006.01) |
| *H02J 9/06* | (2006.01) |
| *G06Q 20/20* | (2012.01) |

(52) U.S. Cl.
CPC ............. *H05K 7/14* (2013.01); *G06F 1/1632* (2013.01); *G06Q 20/20* (2013.01); *G07F 19/205* (2013.01); *H02J 9/06* (2013.01); *G06Q 20/18* (2013.01)

(58) Field of Classification Search
CPC ...... G06F 1/1632; G07F 19/108; G07F 19/20; G07F 19/205
See application file for complete search history.

(56) References Cited

U.S. PATENT DOCUMENTS

| | | | | | |
|---|---|---|---|---|---|
| 3,341,718 | A | * | 9/1967 | Acker | F21S 8/088 174/38 |
| 4,134,537 | A | * | 1/1979 | Glaser | G07F 19/20 235/379 |
| RE30,773 | E | * | 10/1981 | Glaser | G06Q 40/02 235/379 |
| 5,663,746 | A | * | 9/1997 | Pellenberg | G09F 15/005 211/70 |
| 6,003,015 | A | * | 12/1999 | Kang | G06Q 10/087 312/100 |
| 6,062,478 | A | * | 5/2000 | Izaguirre | G06F 1/16 235/462.43 |
| 6,276,602 | B1 | * | 8/2001 | Henderson | G07D 11/0081 235/379 |
| 7,252,276 | B2 | * | 8/2007 | Acketts | A47B 91/005 248/188.8 |

(Continued)

FOREIGN PATENT DOCUMENTS

| | | | | |
|---|---|---|---|---|
| FR | 2706933 A1 | * | 12/1994 | ............... E04H 1/14 |
| GB | 2476028 A | * | 6/2011 | ............. G07F 19/20 |
| GB | 2518582 A | * | 4/2015 | ........... G07F 19/201 |

*Primary Examiner* — Robert J Hoffberg
(74) *Attorney, Agent, or Firm* — Schwegman, Lundberg & Woessner

(57) ABSTRACT

A Self-Service Terminal (SST) plinth is provided. The SST plinth includes one or more fastening mechanisms, a power supply, and one or more communication ports. The fastening mechanisms are configured to fasten an SST to the SST plinth. The SST is powered through the power supply of the plinth. Modules of the SST connect to some of the communication ports, and cabling connects external resources of the SST to the SST though other ones of the plinth's communication ports.

20 Claims, 5 Drawing Sheets

(56) References Cited

U.S. PATENT DOCUMENTS

| | | | | |
|---|---|---|---|---|
| 7,374,258 B2* | 5/2008 | Bowron | ............... | G07F 9/10 |
| | | | | 312/7.2 |
| 7,892,098 B2* | 2/2011 | Nguyen | ............... | G07F 17/32 |
| | | | | 463/16 |
| 8,012,026 B2* | 9/2011 | Dreyer | ............... | G07F 17/32 |
| | | | | 463/1 |
| 8,116,081 B2* | 2/2012 | Crick, Jr. | ............... | G09F 27/00 |
| | | | | 361/679.23 |
| 8,800,872 B2* | 8/2014 | Herring | ............... | G07G 1/0018 |
| | | | | 235/449 |
| 8,949,144 B2* | 2/2015 | Kim | ............... | G07G 1/0018 |
| | | | | 705/16 |
| 9,033,228 B2* | 5/2015 | Govindarajan | ............... | G06Q 90/00 |
| | | | | 235/383 |
| 9,558,482 B2* | 1/2017 | Hicks | ............... | G07G 1/0081 |
| 9,881,292 B2* | 1/2018 | Hicks | ............... | G06Q 20/208 |
| 2002/0124271 A1* | 9/2002 | Herrmann | ............... | G06Q 30/02 |
| | | | | 725/151 |
| 2008/0255901 A1* | 10/2008 | Carroll | ............... | G06Q 30/0237 |
| | | | | 705/14.37 |
| 2015/0085438 A1* | 3/2015 | Lehman | ............... | G07F 17/20 |
| | | | | 361/679.21 |
| 2015/0286252 A1* | 10/2015 | Barone | ............... | G06F 1/1632 |
| | | | | 710/304 |

* cited by examiner

MOUNTING PLINTH FOR SELF-SERVICE TERMINAL (SST)

BACKGROUND

Installation of a Self-Service Terminal (SST) involves a number of independent tasks and specialists that are tightly project managed to get the SST operable as quickly as possible at a retail location.

Some of installation steps of import include: pre-preparing a suitable location for receiving the SST (such as bolting mechanism in the floor at the suitable location); delivering the SST to the suitable location (often very heavy and cumbersome), fixing the SST to the surface (ground or floor using the bolting mechanism), and routing and terminating SST cabling for power, peripherals, and networking.

In a situation where the SST is a terminal that needs enhanced security (such as when the SST is an Automated Teller Machine (ATM)), a set of prepared specialists often work consecutively with predefined tasks to timely install the ATM. This requires tight project-management discipline and ties up staffing resources during installation; both of which add cost and time to the ATM installation project.

Additionally, retail locations often remodel or have needs that necessitate that current locations for SSTs can change at the retail locations. This means that any desired reconfiguration of the SST at the retail locations experience the same drawbacks as that which are associated with new SST installations. Still further, many times a particular problematic SST may need to be swapped out with a different or new SST.

In fact, anytime a retail location experiences a need to install, relocate, and swap out SSTs, the retailer incurs substantial resource costs and operational time delays.

SUMMARY

In various embodiments, apparatuses and a method are provided for a novel SST mounting plinth.

According to an embodiment, a SST mounting plinth apparatus is provided.

Specifically, the SST mounting plinth apparatus includes: an internal interface port, external interface ports, a power supply, and a secure fastening mechanism. The apparatus is configured to: i) attach a Self-Service Terminal (SST) to the interface port, ii) provide communication over at least one external interface port when the SST is attached to the interface port, iii) provide power to the SST from the power supply when the SST is attached, and iv) securely fasten the SST to the apparatus through the secure fastening mechanism.

DETAILED DESCRIPTION

Figure 1:
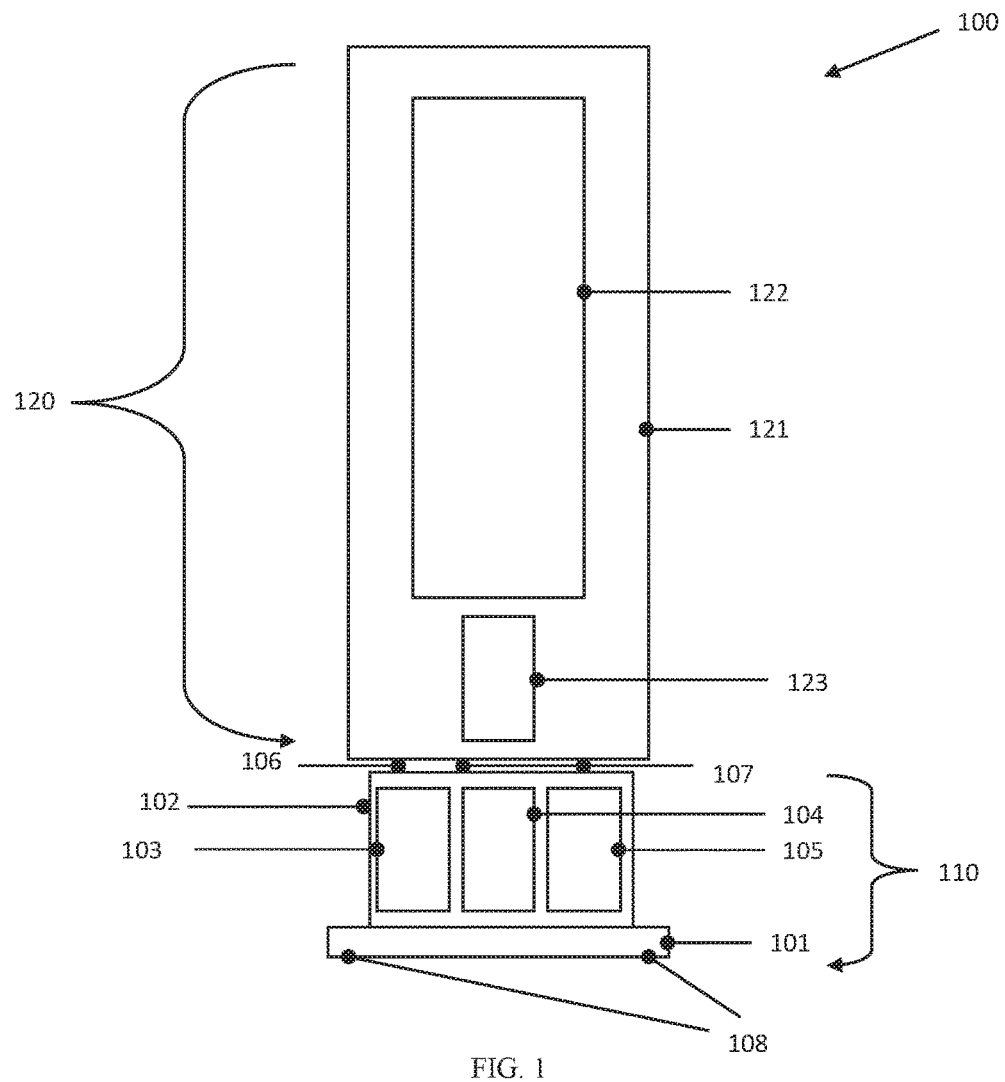
FIG. 1 is a diagram of a combination SST and plinth apparatus, according to an example embodiment.

FIG. 1 is a diagram of a combination SST and plinth apparatus 100, according to an example embodiment. It is to be noted that the configuration is shown schematically in greatly simplified form, with only those components relevant to understanding of this embodiment being illustrated.

The combination SST and plinth apparatus 100 includes a plinth apparatus 110 and an SST apparatus 120. The plinth apparatus 110 includes a horizontal base member 101, a vertical base member 102, a power supply 103, an Uninterrupted Power Supply (UPS) 104, physical power and communication port/interfaces 106, and, optionally, a plinth computing core 105. The SST apparatus 120 includes a secure cabinet/housing 121, a media handling device 122, and, optionally, a SST computing core 123.

The plinth apparatus 110 includes a fastening mechanism (shown in the FIG. 2) for securely fastening the SST apparatus 120 to the plinth apparatus 110. For example, prefabricated screw holes for which bolts can screwed into the plinth apparatus 110 from bolts that pass through prefabricated bolt holes in the secure cabinet/housing 121 of the SST apparatus 120 and screw into the horizontal base member 101 and/or the vertical base member 102 of the plinth apparatus 110 (shown in the FIG. 1 as 107 and a first fastening mechanism). In an embodiment, plinth apparatus includes multiple fastening mechanisms, one to secure fasten the SST apparatus to the plinth apparatus 110 (first fastening mechanism 107) and one to secure the plinth apparatus to a floor or the ground (this may similarly include prefabricated bolt holes—shown in the FIG. 1 as 108 and a second fastening mechanism).

The horizontal base member 101 is longer in length than the vertical base member 102 and is constructed of a sturdy material, such as but not limited to steel. The weight of the horizontal base member 101 can be configured and distributed to provide optimal security and balance to the attached SST apparatus 120.

The vertical base member 102 has more height than that which is associated with the horizontal base member 101. In an embodiment, the vertical base member 102 includes a height adjustment mechanism (not shown in the FIG. 1) that can adjustably raise or lower the vertical height of vertical base member 102 (the adjustment can be internally accessible within the plinth apparatus 110 or can be externally (on the external fascia) accessible on the plinth apparatus. In an embodiment, the vertical base member 102 includes a fixed and prefabricated vertical height that is custom fabricated to a desired vertical height desired by an ordering customer.

The plinth apparatus 110 also includes a power supply 103 that the SST apparatus 120 accessed via one or more of the physical power and communication port/interfaces 106.

The plinth apparatus 110 also includes an UPS 104 to supply power to the SST apparatus 120 when the power supply 103 is unavailable (not plugged into an electrical outlet or when power normally supplied through the electrical outlet is out). This ensures continuous power to the SST apparatus 120 when affixed to the plinth apparatus 110.

The physical power and communication port/interfaces 106 include a variety of connections internally to the SST apparatus 120 and externally for cabling and a power cord connecting to an external fascia of the plinth apparatus 110.

In an embodiment, the at least one of the physical power and communication port/interfaces 106 is a single internal manufactured port connection that provides power and communication interfaces for components of the SST apparatus 120 and peripherals being connected and interfaced to the components of the SST 120 apparatus (such as a single docketing port that is internally accessible from an inside of the plinth apparatus 120).

In an embodiment, the physical power and communication port/interfaces 106 include two ports internally accessible within the plinth apparatus 110 (one for powering the SST apparatus 120 and one for all communication ports to peripherals associated with the SST apparatus 120).

The peripherals that may be connected through the physical power and communication port/interfaces 106 include but are not limited to: display(s), encrypted PINpad, receipt printer, dispenser, depositor, key board, scanner, scale, combined scanner/scale, magnetic card reader, chip-based card reader, and others. It is to be noted that some of these peripherals may be pre-installed within the secure cabinet/housing 121 of the SST apparatus 120 and physical power and communication port/interfaces 106 are needed by these peripherals for network communication with external devices (such as an encrypted PINpad, dispenser, and depositor).

The physical power and communication port/interfaces 106 also include externally facing port/interfaces (accessible from the external fascia of the plinth apparatus 110). These include a power cord connector port for connecting the plinth apparatus 110 to an electrical outlet and external communication ports for communication with network devices, such as one or more Ethernet ports, phone landline ports, Universal Serial Bus (USB) ports, micro card ports, Virtual Graphics Interface (VGI) ports, High-Definition Multimedia Interface (HDMI), wireless transceiver ports (WiFi, Bluetooth®, Radio Frequency, Low-Energy Bluetooth®, Near-Field Communication, Infrared, etc.) component video and audio ports, and others.

The plinth apparatus 110 may also optionally include a plinth computing core 105. The plinth computing core 105 drives processing of the SST apparatus 120 and includes: one or more hardware processors, hardware storage, memory, and executable instructions executed by the one or more processors from the memory, such as an Operating System (OS), a Virtual Machine (VM), device drivers, and other software-based applications residing in non-transitory computer-readable memory and/or storage. In an embodiment, the plinth apparatus 110 includes additional hardware storage that is accessible to a computing core 123 that resides on the SST apparatus 120.

The SST apparatus 120 includes safe cabinet/housing 121 made of sufficiently strong material, such as at some steel reinforced material. Access to the internal housing 121 requires a key access or authenticated electrical mechanical mechanism. The housing 121 minimally includes a media handling device (such as a currency note/check depositor, dispenser, and/or recycler). In an embodiment, the housing 121 provides for integration of some pre-installed independent peripherals (independent of the computing core 123), such as an encrypted PINpad, magnetic card reader, chip-card reader, and the like (in these situations an appropriate slot permits the external (accessible to the externally-facing fascia of the housing 121) components of these pre-installed peripherals to be operated by a customer of the SST apparatus 120.

In an embodiment, the SST apparatus 120 includes a computing core 123.

In an embodiment, the plinth apparatus 110 is affixed to a surface, such as a floor or the ground (through a bolting mechanism). Cabling to external devices and an electrical outlet are connected to the externally facing power and communication port/interfaces 106. At some later time, the SST apparatus 120 is internally affixed to the plinth apparatus 110 and the SST apparatus 120 is connected to the internally facing power and communication port/interfaces 106. At this point, the SST apparatus 120 is ready to be powered on and made operational.

Since the power supply 103 and the UPS 104 are housed in the plinth apparatus 110, the SST apparatus 120 is less bulky, requires less space, and is lighter than conventional SSTs. Moreover, because the plinth apparatus 110 can be pre-affixed to a surface or structure (such as inside cabinetry) and pre-wired. This part of installation can occur more efficiently and while awaiting delivery of the SST apparatus 120. Still further, swapping SST apparatuses 120 around is easier because it is detached from its plinth 110 and moved to another plinth 110. Additionally, an enterprise can deploy more plinths 110 then SST apparatuses 120 allowing for the enterprise to grow to more SST apparatuses 120 or to swamp and move around existing SST apparatuses to different plinths 110 within the enterprise.

In an embodiment, the SST apparatus 120 is an ATM.

In an embodiment, the SST apparatus 120 is a kiosk.

In an embodiment, the SST apparatus 120 is a Point-Of-Sale (POS) terminal.

Figure 2:
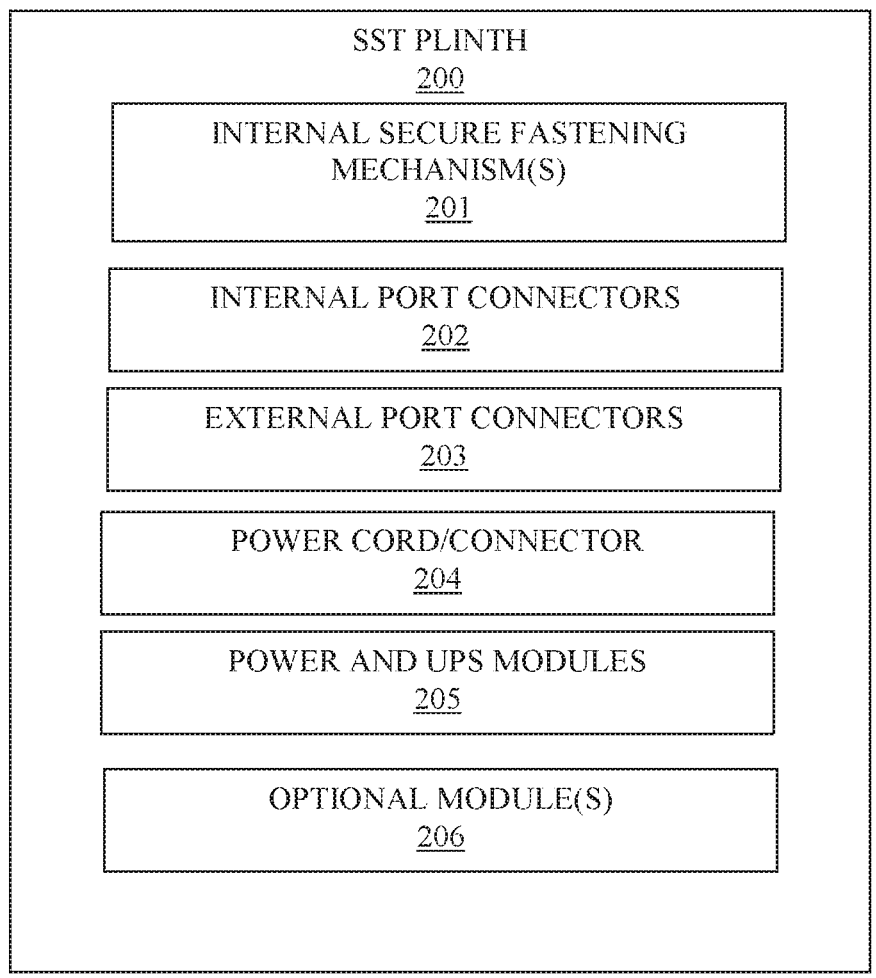
FIG. 2 is a diagram of an SST plinth, according to an example embodiment.

FIG. 2 is a diagram of an SST plinth apparatus 200, according to an example embodiment. Again, it is to be noted that the configuration is shown schematically in greatly simplified form, with only those components relevant to understanding of this embodiment being illustrated.

In an embodiment, the SST plinth apparatus 200 is the combination SST and plinth apparatus 100 of the FIG. 1.

The SST plinth apparatus 200 includes: internal secure fastening mechanism(s) 201, internal port connectors 202, external port connectors 203, a power cord/connector 204, power and UPS modules 205, and, zero or more optional hardware computing modules 206.

The internal secure fastening mechanism(s) 201 include one or more of: prefabricated bolt alignment holes matching alignment holes on an inside an SST apparatus (inside a secure housing of the SST apparatus, prefabricated bolt alignment holes for affixing the SST plinth apparatus 200 to a surface or structure, secure clamps, and the like.

The internal port connectors 202 include one or more of: a single connector for all modules and peripherals of the SST apparatus and multiple connectors for different ones of the modules and peripherals of the SST apparatus. The connectors can be any of those discussed above with reference to the ports 106 of the FIG. 1.

The external port connectors 203 include one or more of the ports 106 discussed above with the FIG. 1.

The power/cord connector 204 may include a port for attaching a power cord from the SST plinth apparatus 200 to an electrical outlet for power or may include a prefabricated power cord of the SST plinth apparatus 200 that is connectable to the electrical power outlet.

The power and UPS modules 205 regulate and provide power to the SST plinth apparatus 200 and to an SST apparatus when affixed and connected to the SST plinth apparatus 200. In an embodiment, the power and UPS modules are the power supply 103 and the UPS 104 of the FIG. 1.

In an embodiment, the SST plinth apparatus 200 optionally includes a computing core as an optional hard module 206 (as discussed above with the plinth apparatus 110 and computing core 105 of the FIG. 1). In an embodiment, the SST plinth apparatus 200 includes a hardware storage device as an optional module 206.

In an embodiment, the SST apparatus that affixes and interfaces through the SST plinth apparatus 200 is the SST apparatus 120 of the FIG. 1.

In an embodiment, the SST apparatus that affixes and interfaces through the SST plinth apparatus 200 is an ATM.

In an embodiment, the SST plinth apparatus 200 that affixes and interfaces through the SST plinth apparatus is a kiosk.

In an embodiment, the SST plinth apparatus 200 that affixes and interfaces through the SST plinth apparatus is a POS terminal.

Figure 3:
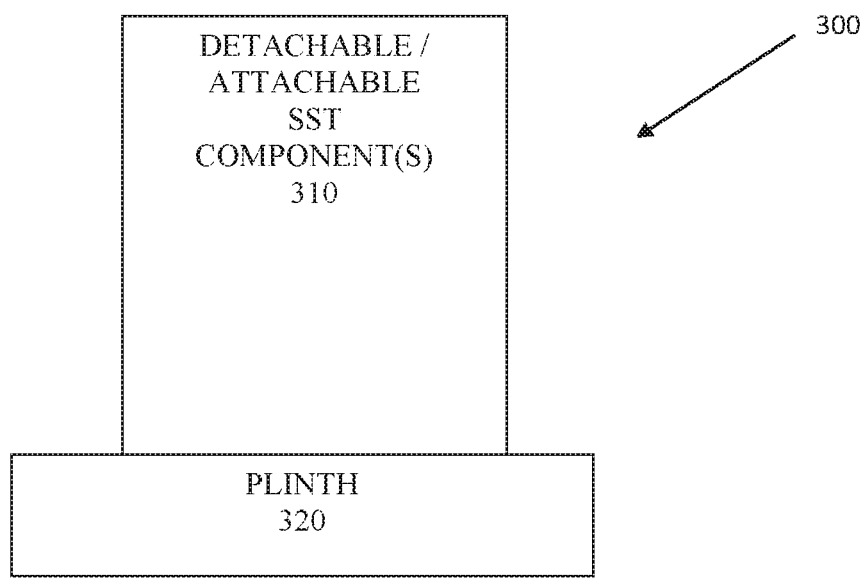
FIG. 3 is a diagram of another combination SST and plinth apparatus, according to an example embodiment.

FIG. 3 is a diagram of another combination SST and plinth apparatus 300, according to an example embodiment. The configuration is shown schematically in greatly simplified form, with only those components relevant to understanding of this embodiment being illustrated.

The combination SST and plinth apparatus 300 includes a detachable and attachable SST component or set of components 310. The SST component or set of modular hardware components 310 are configured to affix to the plinth 320. The plinth 320 also providing a secure docking station of the SST component or set of module hardware components 310 and interface connections to external devices (peripherals, network-based devices, or other hardware computing devices).

The SST component or set of components 310 is also configured to be detached from the plinth 320.

In an embodiment, the plinth 320 is configured to be affixed to and removed from a surface or structure independent of any SST component 310.

In an embodiment, the plinth 320 includes wheels on a surface facing underside of the plinth providing mobility to the combination SST and plinth apparatus 300.

In an embodiment, the SST component or set of components 310 is the SST apparatus 120 of the FIG. 1.

In an embodiment, the plinth 320 is the SST plinth 110 of the FIG. 1.

In an embodiment, the plinth 320 is the SST plinth apparatus 200 of the FIG. 2.

In an embodiment, the combination SST and plinth apparatus 300 is the combination SST and plinth apparatus 100 of the FIG. 1.

Figure 4:
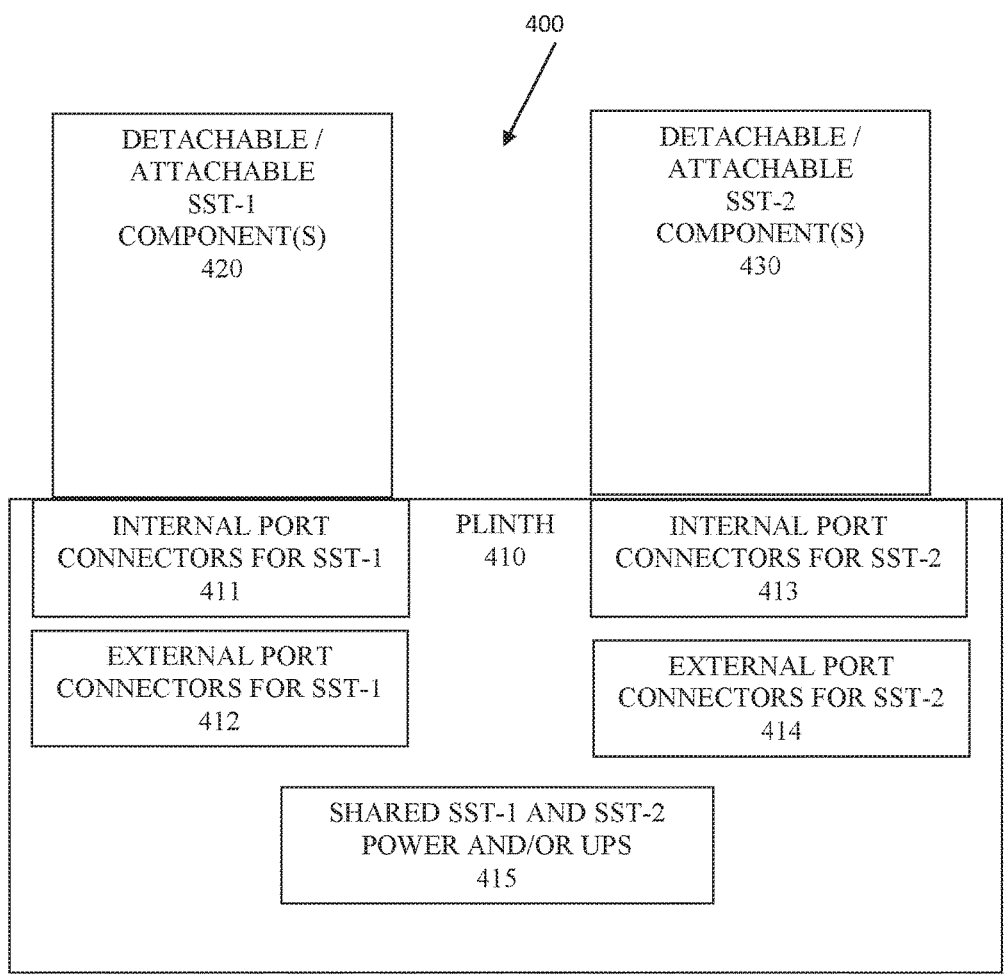
FIG. 4 is a diagram of a combination of SSTs and single plinth apparatus, according to an example embodiment.

FIG. 4 is a diagram of a combination of SSTs and single plinth apparatus 400, according to an example embodiment. The configuration is shown schematically in greatly simplified form, with only those components relevant to understanding of this embodiment being illustrated.

The combination SST and plinth apparatus 400 includes a plinth having at least two (or more) separate and independent: internal port connectors (411 and 413) and external port connectors 412 and 414. The combination SST and plinth apparatus 400 also includes a single shared power supply and UPS 415; shared when more than one attached SST component is affixed and interfaced to the combination SST and plinth apparatus 400 (420 and 430).

The plinth 410 provides shared power and shared UPS between multiple SST components 420 and 430 while at the same time providing individual and secure internal and external ports (411-415) for each independent SST component 420 and 430.

In an embodiment, the SST components 420 and 430 are the SST apparatuses 110 and/or the SST apparatuses 310 of the FIGS. 1 and 3, respectively. In an embodiment, at least one of the SST apparatuses 420 or 430 is an ATM. In an embodiment, at least one of the SST apparatuses 420 or 430 is a kiosk. In an embodiment, at least of the SST apparatuses 420 or 430 is a POS terminal. In an embodiment, at least one of the SST apparatus is one type of SST (ATM, kiosk, or POS terminal) and another one of the SST apparatuses is a different type of SST from the first type.

In an embodiment, the port connectors 411-414 are the ports 106 of the FIG. 1.

In an embodiment, the port connectors 411-414 are the ports 203, 204, and 205 that were discussed above with the discussion of the FIG. 2.

In an embodiment, the plinth 410 includes at least one computing core for at least one of the SST components 420 and/or 430. In an embodiment, the computing core is the computing core 105 of the FIG. 1.

In an embodiment, the plinth 410 includes at least one optional hardware computing module for at least one of the SST components 420 and/or 430. In an embodiment, the optional computing module is the optional module(s) 206 of the FIG. 2.

In an embodiment, the plinth 410 is the plinth 110 of the FIG. 1 having a single elongated horizontal base with sufficient space to attach and interface multiple independent SST components 420 and 430 with multiple and independent port connectors 411-414 for each SST component 420 and 430. The plinth 410 further includes independent vertical base members (and optionally each separately height adjustable independent of the other) for each separate SST component 420 and 430 with sufficient distance between each vertical base member to attach two or more SST components 420 and 430 to the plinth 410.

In an embodiment, the plinth 410 includes separate internal fastening mechanisms (such as what was described above with any of the FIGS. 1-3) to separately attach each different SST component 420 and 430. In an embodiment, the plinth 410 also includes a single fastening mechanism for affixing the plinth 410 to a surface or structure. In an embodiment, the plinth 410 includes wheels on a surface-facing underside of the plinth 410 for mobility of the plinth 410 with or without the SST components 420 and/or 430 affixed to the plinth 410.

Figure 5:
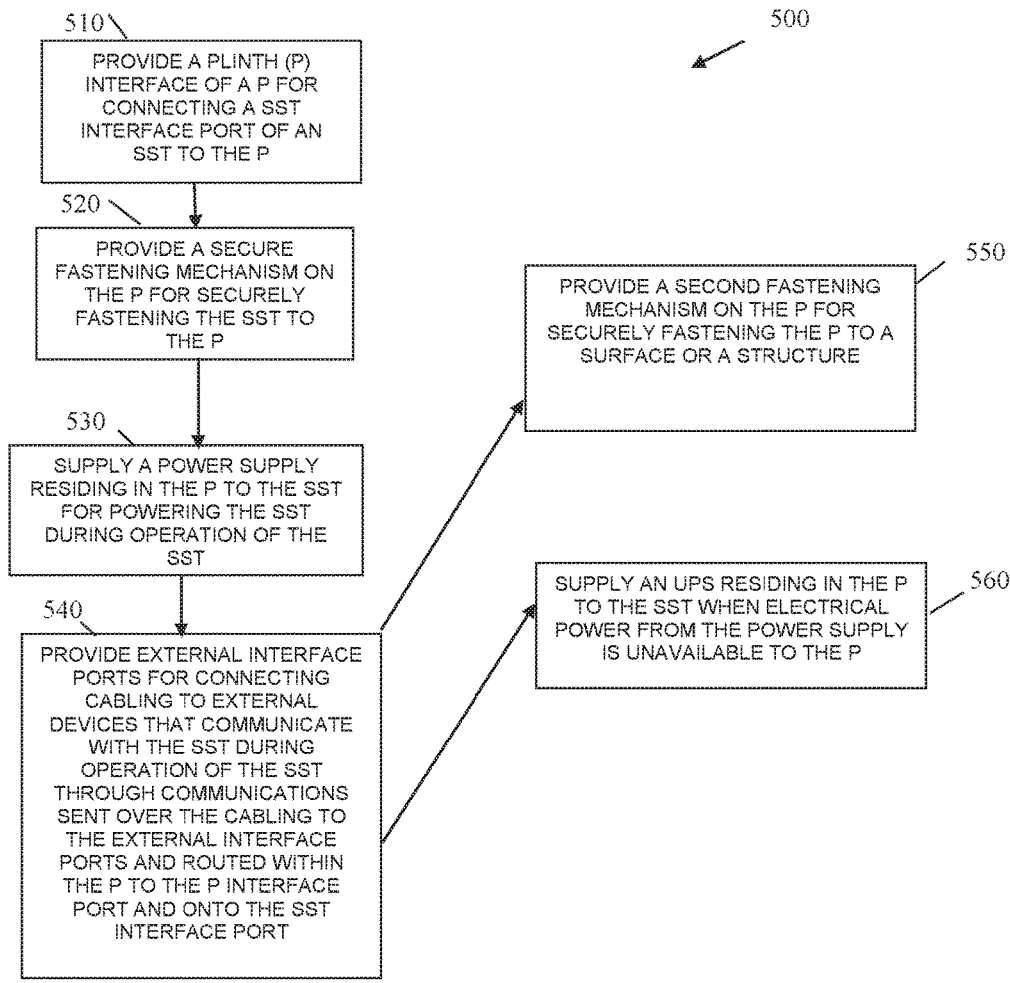
FIG. 5 is a diagram of a method for connecting an SST to a plinth apparatus, according to an example embodiment.

FIG. 5 is a diagram of a method 500 for connecting an SST to a plinth apparatus, according to an example embodiment.

At 510, a plinth interface port of a plinth is provided for connecting a SST port of an SST to the plinth.

At 520, a secure fastening mechanism on the plinth is provided for securely fastening the SST to the plinth.

At 530, a power supply residing on the plinth is provided to the SST for powering the SST during operation of the SST while connected to the plinth.

At 540, external interface ports residing on the plinth is provided for connecting cabling to external devices that communicate with the SST during operation of the SST through communications sent over the cabling to the external interface ports and routed within the plinth to the plinth interface port and onto the SST interface ports. The external interface ports residing on the plinth also provide communication originating from the SST to the external devices by receiving the communication through the SST interface port connected to the plinth interface port and routing the communication through the plinth to select ones of the external interface ports and delivery over the cabling.

According to an embodiment, at 550, a second secure fastening mechanism on the plinth is provided for securely fastening the plinth to a surface or a structure.

In an embodiment, at 560, an UPS residing on the plinth is supplied to the SST during operation of the SST when electrical power to the power supply of the plinth is unavailable (i.e., the plinth is disconnected from a power source or the power source is out).

In an embodiment, the plinth interface port and the plinth external interface ports are any of the ports discussed above with the FIGS. 1-4.

In an embodiment, the plinth is any of the plinth apparatuses discussed above with the FIGS. 1-4.

In an embodiment, the SST is any of the SST apparatuses discussed above with the FIGS. 1-4.

In an embodiment, the secure fastening mechanism and the second secure fastening mechanism is any of the fastening mechanisms discussed above with the FIGS. 1-4.

In an embodiment, the power supply and the UPS is any of the power supplies and UPSs discussed above with the FIGS. 1-4.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A system, comprising:
   a plinth apparatus including:
      a plinth internal interface port;
      external interface ports;
      a power supply;
      a secure fastening mechanism;
      a horizontal base member; and
      a vertical base member,
      wherein the horizontal base member is longer in length than the vertical base member and the vertical base member has a greater height than the horizontal base member, the vertical base member is affixed on a top of the horizontal base member, and
      wherein an underside of the horizontal base member is affixed to a floor or a ground surface through a bolting mechanism;
   an Self-Service Terminal apparatus (SST) including:
      an SST computing core;
      integrated peripheral devices, the integrated peripheral devices comprise a depositor, a dispenser, a recycler, an encrypted Personal Identification (PIN) pad, a magnetic card reader, a chip-card reader, and a keyboard;
      a safe cabinet, the safe cabinet constructed of at least some steel reinforced material, wherein the safe cabinet includes the SST computing core and the integrated peripheral devices, and the SST computing core is interfaced to the integrated peripheral devices within the safe cabinet; and
      an SST internal interface port, the SST computing core is interfaced to the SST internal interface port within the safe cabinet;
   wherein the plinth internal interface port is adapted to be:
      attached to the SST internal interface port of the SST,
      detached from the SST internal interface port of the SST, and re-attached to the SST internal interface port of a different one of the SST;
   wherein the external interface ports of the plinth apparatus are adapted to: provide power and communication to the SST through the plinth apparatus when the SST internal interface port is attached to the plinth internal interface port;
   wherein the power supply is adapted to: (a) provide power to the plinth apparatus and (b) the SST computing core and the integrated peripheral devices of the SST via the SST internal interface port when the SST is attached to the plinth internal interface port;
   wherein the secure fastening mechanism is adapted to: securely fasten the SST to the plinth apparatus, the secure fastening mechanism disposed at least in part on an inside of the safe cabinet associated with the SST, and
   wherein a weight of the horizontal base member of the plinth apparatus is distributed for balancing the SST when the SST is attached to the vertical base member of the plinth apparatus.

2. The system of claim 1, wherein
   the secure fastening mechanism for securely fastening the SST to the vertical base member of the plinth apparatus, and
   the bolting mechanism is another secure fastening mechanism for securely fastening the horizontal base member of the plinth apparatus to the floor or the ground surface.

3. The system of claim 1, wherein the SST is adapted to attach to the vertical base member of the plinth apparatus with a bottom of the SST fastened through the secure fastening mechanism to a top of the vertical base member.

4. The system of claim 3, wherein the vertical base member is height adjustable to raise and lower a height of the vertical base member.

5. The system of claim 1, wherein the plinth apparatus further including:
   a second plinth internal interface port;
   second external interface ports; and
   a second one of the secure fastening mechanism;
   wherein the plinth apparatus is further configured to:
      attach a second one of the SST having a second one of the SST computing core to the second plinth internal interface port, provide communication over at least one of the second external interface ports when the second one of the SST is attached to the second plinth internal interface port, provide shared power to the SST computing core and the second one of the SST computing core from the power supply when the SST and the second one of the SST are attached, and securely fasten the second SST to the plinth apparatus through the second one of the secure fastening mechanism.

6. The system of claim 1, wherein the integrated peripherals further include one or more of: a display, a scanner, a scale, and/or a combined scanner/scale.

7. A system, comprising:
   a plinth apparatus including:
      a plinth internal interface port;
      external interface ports;
      a power supply;
      a secure fastening mechanism;
      a horizontal base member; and
      a vertical base member,
      wherein the horizontal base member is longer in length than the vertical base member and the vertical base member has a greater height than the horizontal base member, the vertical base member is affixed on a top of the horizontal base member, and wherein the underside of the horizontal base member includes wheels configured to rest on a flat horizontal surface;

an Self-Service Terminal apparatus (SST) including:

an SST computing core;

integrated peripheral devices, the integrated peripheral devices comprise a depositor, a dispenser, a recycler, an encrypted Personal Identification (PIN) pad, a magnetic card reader, a chip-card reader, and a keyboard;

a safe cabinet, the safe cabinet constructed of at least some steel reinforced material, wherein the safe cabinet includes the SST computing core and the integrated peripheral devices, and the SST computing core is interfaced to the integrated peripheral devices within the safe cabinet; and an SST internal interface port, the SST computing core is interfaced to the SST internal interface port within the safe cabinet;

wherein the plinth internal interface port is adapted to be: attached to the SST internal interface port of the SST, detached from the SST internal interface port of the SST, and re-attached to the SST internal interface port of a different one of the SST;

wherein the external interface ports of the plinth apparatus are adapted to: provide power and communication to the SST through the plinth apparatus when the SST internal interface port is attached to the plinth internal interface port;

wherein the power supply is adapted to: (a) provide power to the plinth apparatus and (b) the SST computing core and the integrated peripheral devices of the SST via the SST internal interface port when the SST is attached to the plinth internal interface port;

wherein the secure fastening mechanism is adapted to: securely fasten the SST to the plinth apparatus, the secure fastening mechanism disposed at least in part on an inside of the safe cabinet associated with the SST, and wherein a weight of the horizontal base member of the plinth apparatus is distributed for balancing the SST when the SST is attached to the vertical base member of the plinth apparatus.

8. The system of claim 7, wherein the secure fastening mechanism for securely fastening the SST to the vertical base member of the plinth apparatus.

9. The system of claim 8, wherein the SST is adapted to attach to the vertical base member of the plinth apparatus with a bottom of the SST fastened through the secure fastening mechanism to a top of the vertical base member.

10. The system of claim 7, wherein the vertical base member is height adjustable to raise and lower a height of the vertical base member.

11. The system of claim 7, wherein the plinth apparatus further including:

a second plinth internal interface port;

second external interface ports; and a second one of the secure fastening mechanism;

wherein the plinth apparatus is further configured to:

attach a second one of the SST having a second one of the SST computing core to the second plinth internal interface port, provide communication over at least one of the second external interface ports when the second one of the SST is attached to the second plinth internal interface port, provide shared power to the SST computing core and the second one of the SST computing core from the power supply when the SST and the second one of the SST are attached, and securely fasten the second SST to the plinth apparatus through the second one of the secure fastening mechanism.

12. The system of claim 7, wherein the integrated peripherals further include one or more of: a display, a scanner, a scale, and/or a combined scanner/scale.

13. A method, comprising:

providing a plinth internal interface port of a plinth;

connecting a Self-Service Terminal (SST) interface port of an SST to the plinth;

detaching the SST interface port of the SST from the plinth internal interface port, re-connecting the SST interface port of a different one of the SST to the plinth internal interface port;

providing one of:

bolt fastening of an underside of a horizontal base member of the plinth adapted for fastening to a floor or a ground surface, or wheels adapted for resting the underside of the horizontal base member on a flat horizontal surface;

providing a vertical base member of the plinth affixed to the horizontal base member, wherein the horizontal base member is longer in length than the vertical base member and the vertical base member is greater in height than the horizontal base member, and wherein a weight of the horizontal base member is distributed for balancing the SST when attached to the vertical base member of the plinth;

providing a secure fastening mechanism on the plinth for securely fastening the SST to the vertical base member of the plinth, the secure fastening device at least in part within an inside of a safe cabinet of the SST;

supplying electrical power using a power supply residing in the plinth to the SST computing core located within the safe cabinet for powering the SST during operation of the SST;

providing external interface ports of the plinth for connecting cabling to external devices that communicate with the SST during operation of the SST through communications sent over the cabling to the external interface ports and routed within the plinth to the plinth interface port and through the SST interface port to the SST; and providing an SST computing device located within a safe cabinet of the SST, the power supply of the plinth powering the SST computing core during operation of the SST computing core, the SST interface port allowing for the external devices to communicate with the SST computing device;

providing an interface associated with the plinth interface port and the SST interface port that provides communication to peripherals of the SST through the interface, the peripherals are disposed within the safe cabinet of the SST and are connected the SST computing, the peripherals comprising a depositor, a dispenser, a recycler, an encrypted Personal Identification Number (PIN) input keypad, a magnetic card reader, a chip-card reader, a receipt printer, a dispenser, a depositor, and a keyboard.

14. The method of claim 13, wherein the bolt fastening is a second secure fastening mechanism on the underside of the horizontal base member of the plinth for securely fastening the plinth to the floor or the ground surface.

15. The method of claim 13, further comprising, supplying back-up power using an Uninterruptable Power Supply (UPS) residing in the plinth to the SST when the electrical power supplied by the power supply is unavailable to the plinth.

16. The method of claim 13, wherein the integrated peripherals further include one or more of: a display, a scanner, a scale, and/or a combined scanner/scale.

17. The method of claim 13, further comprising, one of:
powering the plinth and the SST through an electrical outlet; and
powering the plinth and the SST through an Uninterruptable Power Supply (UPS) when the electrical power is unavailable through the electrical outlet.

18. The method of claim 13, wherein at least one of the external interface ports of the plinth is a power cord connector for connecting the plinth to an electrical outlet.

19. The method of claim 13, wherein the external interface ports of the plinth comprise: at least one Ethernet port, at least one micro card port, at least one Virtual Graphics Interface (VGI) port, at least one High-Definition Multimedia Interface (HDMI) port, at least one wireless transceiver port, and at least one component video and audio port.

20. The method of claim 13, further comprising, providing access to an inside of the secure cabinet of the SST through one of: a key and an authenticated electrical-mechanical mechanism.

\* \* \* \* \*